(12) United States Patent
Maeda et al.

(10) Patent No.: US 12,040,658 B2
(45) Date of Patent: Jul. 16, 2024

(54) MOTOR MEMBER, MOTOR, AND METHOD FOR MANUFACTURING MOTOR MEMBER

(71) Applicant: Nidec Corporation, Kyoto (JP)

(72) Inventors: Shigeru Maeda, Kyoto (JP); Ryoma Sasaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 284 days.

(21) Appl. No.: 17/626,524

(22) PCT Filed: Jul. 13, 2020

(86) PCT No.: PCT/JP2020/027205
§ 371 (c)(1),
(2) Date: Jan. 12, 2022

(87) PCT Pub. No.: WO2021/020085
PCT Pub. Date: Feb. 4, 2021

(65) Prior Publication Data
US 2022/0239167 A1 Jul. 28, 2022

(30) Foreign Application Priority Data
Jul. 31, 2019 (JP) .................................. 2019-140406

(51) Int. Cl.
*H02K 1/14* (2006.01)
*H02K 1/16* (2006.01)
*H02K 15/02* (2006.01)

(52) U.S. Cl.
CPC ............... *H02K 1/148* (2013.01); *H02K 1/16* (2013.01); *H02K 15/024* (2013.01)

(58) Field of Classification Search
CPC ........ H02K 1/148; H02K 1/16; H02K 15/024; H02K 1/246; H02K 7/003; H02K 1/28;
(Continued)

(56) References Cited

U.S. PATENT DOCUMENTS

2019/0199186 A1* 6/2019 Noh ...................... H02K 21/20

FOREIGN PATENT DOCUMENTS

CN       206834868 U      1/2018
JP        3078288 B1 *    8/2000
(Continued)

OTHER PUBLICATIONS

Official Communication issued in International Patent Application No. PCT/JP2020/027205, mailed on Oct. 6, 2020.
(Continued)

*Primary Examiner* — Ahmed Elnakib
(74) *Attorney, Agent, or Firm* — Keating & Bennett, LLP

(57) ABSTRACT

A motor armature includes a laminated body including a stack of magnetic bodies each having an annular and plate shape, an extended body that opposes an opposing peripheral surface that is at least one of an inner peripheral surface and an outer peripheral surface of the laminated body and extends along a stacking direction of the magnetic bodies, and a holder stacked on the laminated body in the stacking direction to hold the laminated body. The holder includes a plate portion that extends along the laminated body and has higher rigidity than the magnetic bodies, and a sleeve portion that extends in contact with the extended body.

12 Claims, 16 Drawing Sheets

(58) Field of Classification Search
CPC .......... H02K 15/022; H02K 1/22; H02K 1/04; H02K 1/146; H02K 1/30; H02K 2213/03
USPC ................................................ 310/216.004
See application file for complete search history.

(56) References Cited

FOREIGN PATENT DOCUMENTS

| | | | |
|---|---|---|---|
| JP | 2007-110873 | A | 4/2007 |
| JP | 2009-201270 | A | 9/2009 |
| JP | 2011-019298 | A | 1/2011 |
| JP | 2012-253884 | A | 12/2012 |
| JP | 2014-72903 | A | 4/2014 |
| JP | 2016-5308 | A | 1/2016 |
| JP | 2016005308 | * | 1/2016 |
| JP | 2016-201896 | A | 12/2016 |
| JP | 2016201896 | * | 12/2016 |

OTHER PUBLICATIONS

Official Communication issued in corresponding Chinese Patent Application No. 202080053964.6, mailed on May 27, 2023.

* cited by examiner

MOTOR MEMBER, MOTOR, AND METHOD FOR MANUFACTURING MOTOR MEMBER

CROSS-REFERENCE TO RELATED APPLICATIONS

This is a U.S. national stage of application No. PCT/JP2020/027205, filed on Jul. 13, 2020, and with priority under 35 U.S.C. § 119(a) and 35 U.S.C. § 365(b) being claimed from Japanese Patent Application No. 2019-140406, filed on Jul. 31, 2019, the entire disclosures of which are hereby incorporated herein by reference.

1. FIELD OF THE INVENTION

The present disclosure relates to a motor armature, a motor, and a method for manufacturing a motor armature.

2. BACKGROUND

Conventional motors have magnetic portions that are each often formed by using a laminated body called a laminated core or the like in which magnetic steel plates or the like are laminated. Examples of the laminated core include a laminated core provided with a coil, a laminated core provided with a permanent magnet attached, and a laminated core provided with no coil and no permanent magnet, being used as a rotor as it is. As a method for fixing the laminated core to a shaft, a case, a holder, or the like at the time of manufacturing, fixing by press-fitting is common.

For example, a bearing holder provided with a laminated core fixed to an outer periphery of the bearing holder is conventionally known.

However, the magnetic steel plate or the like laminated in the laminated body is a thin and fragile member, and thus may be broken at the uppermost portion or the lowermost portion of the lamination due to press-fitting of the shaft or the like.

SUMMARY

An example embodiment of a motor armature according to the present disclosure includes a laminated body including a stack of magnetic bodies each having an annular and plate shape, an extended body that opposes an opposing peripheral surface that is at least one of an inner peripheral surface and an outer peripheral surface of the laminated body and extends along a stacking direction of the magnetic bodies, and a holder stacked on the laminated body in the stacking direction to hold the laminated body. The holder includes a plate portion that extends along the laminated body and has higher rigidity than the magnetic bodies, and a sleeve portion that extends in contact with the extended body. The extended body includes a first shoulder surface opposing an extending direction of the extended body and being in contact with the holder to position the extended body in the extending direction, and a second shoulder surface opposing a circumferential direction around the opposing peripheral surface and being in contact with the holder to position the extended body in the circumferential direction.

A motor according to another example embodiment of the present disclosure includes the motor armature according to the above-identified example embodiment that defines at least one of a stator and a rotor.

A further example embodiment of the present disclosure provides a method of manufacturing a motor armature including a laminated body including a stack of magnetic bodies each having an annular and plate shape, an extended body that opposes an opposing peripheral surface that is at least one of an inner peripheral surface and an outer peripheral surface of the laminated body and extends along a stacking direction of the magnetic bodies, and a holder stacked on the laminated body in the stacking direction to hold the laminated body. The method includes holding the holder including a plate portion that extends along the laminated body and has higher rigidity than the magnetic bodies and a sleeve portion that extends in contact with the extended body while stacking the holder on the laminated body, press-fitting the extended body into the laminated body held by the holder, the extended body including a first shoulder surface opposing an extending direction of the extended body and a second shoulder surface opposing a circumferential direction around the opposing peripheral surface, and positioning the first shoulder surface in the extending direction by bringing the first shoulder surface into contact with the holder and the second shoulder surface in the circumferential direction by bringing the second shoulder surface into contact with the holder.

The above and other elements, features, steps, characteristics and advantages of the present disclosure will become more apparent from the following detailed description of the example embodiments with reference to the attached drawings.

DETAILED DESCRIPTION

Figure 1:
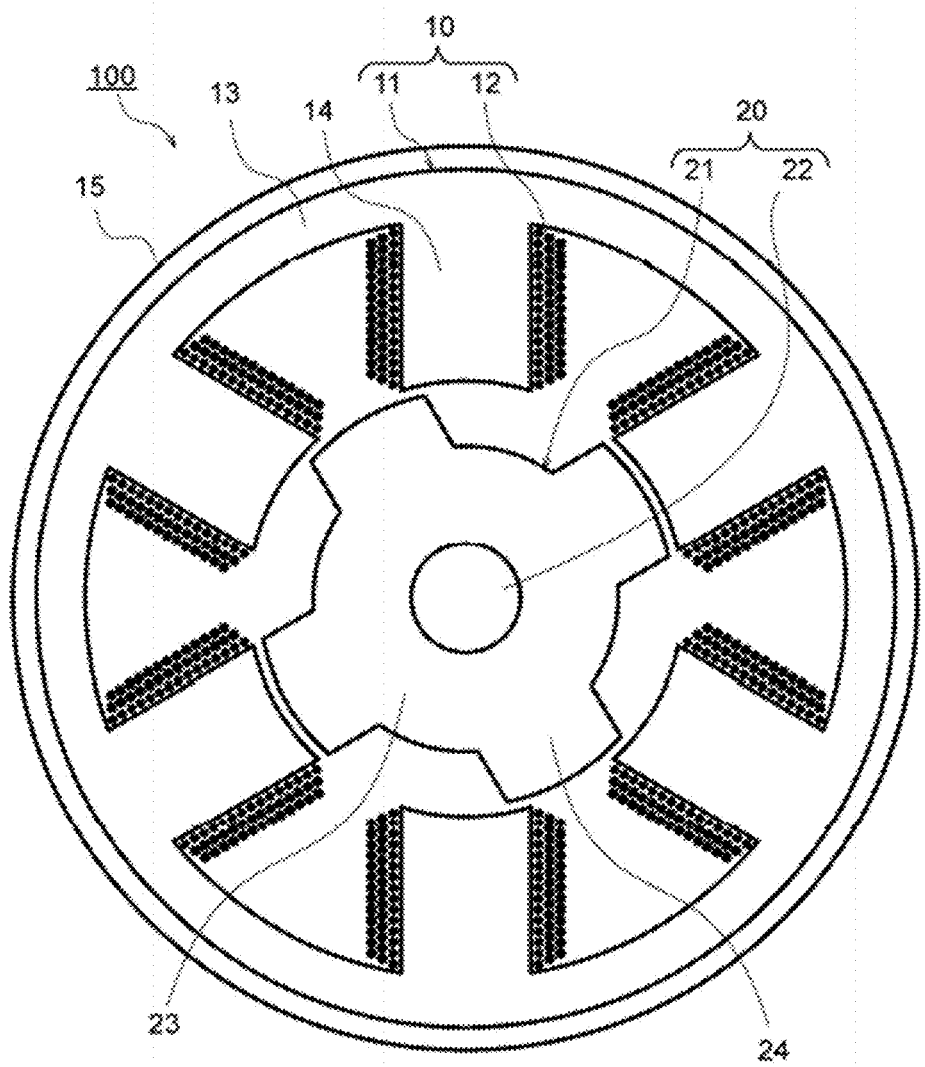
FIG. 1 illustrates structure of a motor of an example embodiment of the present disclosure.

Hereinafter, example embodiments of motor armatures, motors, and methods for manufacturing motor armatures of the present disclosure will be described in detail with reference to the accompanying drawings. However, to avoid unnecessarily redundant description below and facilitate understanding by those skilled in the art, unnecessarily detailed description may be eliminated. For example, detailed description of already well-known matters and duplicated description of a substantially identical configuration may be eliminated. FIG. 1 illustrates structure of a motor 100 of the present example embodiment.

The motor 100 of the present example embodiment is, for example, a switched reluctance motor with an inner rotor, and is, for example, a three-phase motor. The motor 100 includes a stator 10 and a rotor 20 inserted inside the stator 10. The stator 10 generates a rotating magnetic field, and the rotor 20 rotates around the stator 10 using the rotating magnetic field.

The stator 10 includes a laminated core 11 and a coil 12. The laminated core 11 of the stator 10 includes a ring portion in an annular shape and for example, six salient poles 14 protruding from the ring portion 13 toward the rotor 20. The coil 12 is provided by concentrated winding around a salient pole 14, and the stator 10 includes, for example, three-phase two-pole magnetic poles. The stator 10 is inserted into and fixed to a case 15 in a cylindrical shape.

The rotor 20 includes a laminated core 21 and a shaft 22. The laminated core 21 includes a cylindrical portion 23 into which the shaft 22 is inserted, and for example, four salient poles 24 protruding from the cylindrical portion 23 toward the stator 10.

The rotor 20 is a motor armature of a first example embodiment of the present disclosure, and a combination of the stator 10 and the case 15 is a motor armature of a second example embodiment of the present disclosure.

Figure 2:
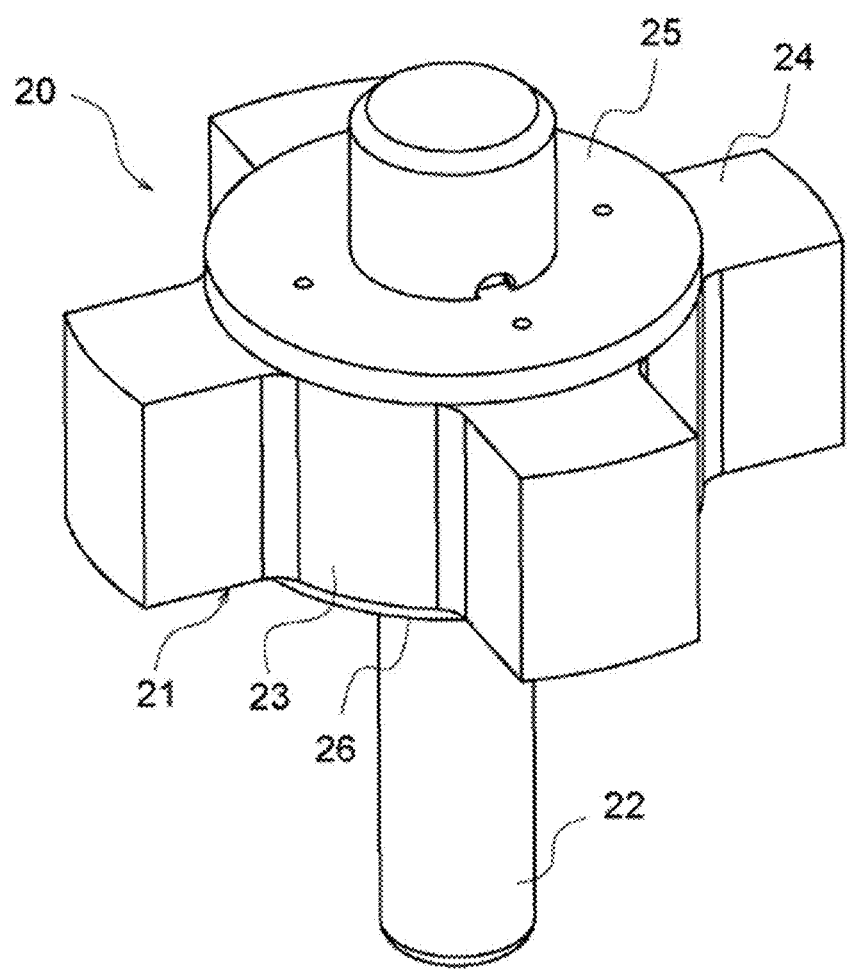
FIG. 2 is an upper perspective view illustrating structure of a rotor of an example embodiment of the present disclosure.
Figure 3:
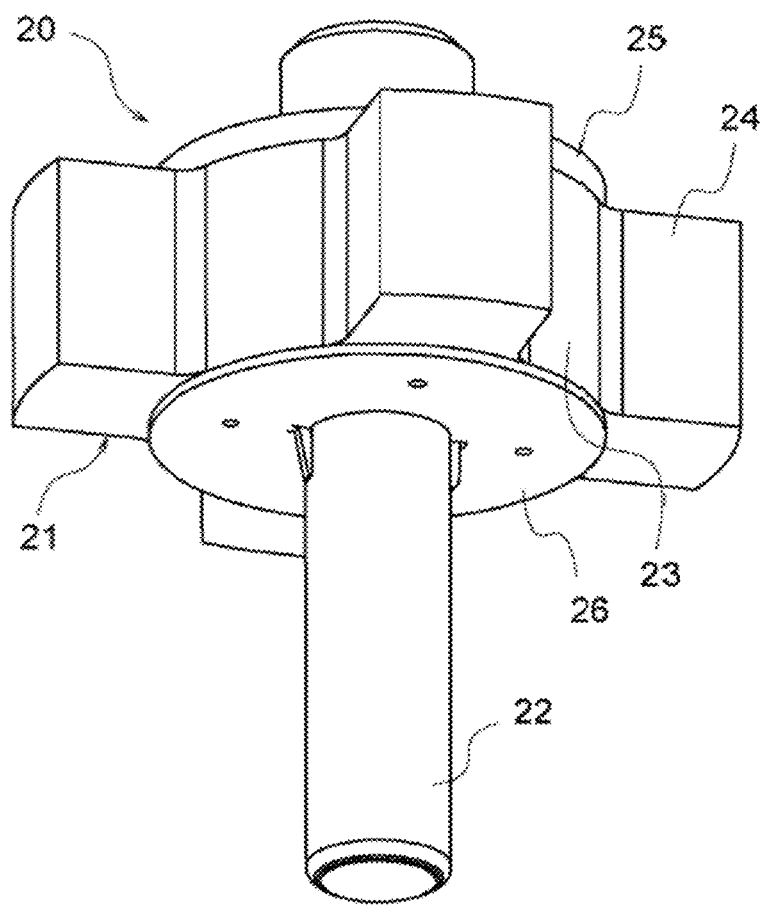
FIG. 3 is a lower perspective view illustrating structure of a rotor of an example embodiment of the present disclosure.

FIGS. 2 and 3 are each a perspective view illustrating structure of the rotor 20. FIG. 2 illustrates an upper perspective view, and FIG. 3 illustrates a lower perspective view. However, "up" and "down" in the present specification do not mean a gravity direction, and are "up" and "down" for convenience of description. That is, a depth direction in FIG. 1 is referred to as a vertical direction for convenience, a side mainly illustrated in FIG. 2 is referred to as an "upper side", and a side mainly illustrated in FIG. 3 is referred to as a "lower side".

The shaft 22 of the rotor 20 is press-fitted into the laminated core 21 from the upper side and elongates downward. The laminated core 21 is provided with an upper flange 25 and a lower flange 26 that are stacked on the cylindrical portion 23 to hold the cylindrical portion 23 from above and below, respectively. Each of the upper flange 25 and the lower flange 26 corresponds to an example of a holder according to the present disclosure that is stacked on the laminated body in a stacking direction and holds the laminated body.

The upper flange 25 and the lower flange 26 stacked on the laminated core 21 protect the laminated core 21 when the rotor 20 is press-fitted. The upper flange 25 and the lower flange 26 perform positioning of the shaft 22 press-fitted. Specifically, the upper flange 25 and the lower flange 26 perform positioning of the shaft 22 in its extending direction (serve as so-called stoppers or retainers) and positioning of the shaft 22 in its circumferential direction (so-called anti-rotation).

Figure 4:
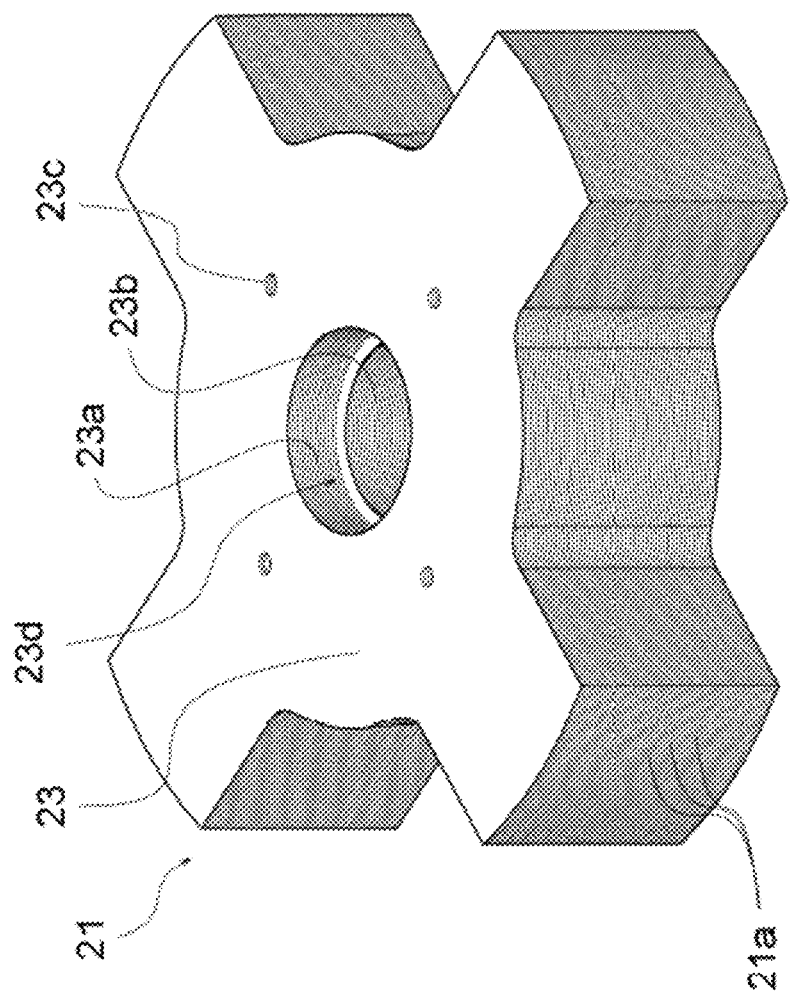
FIG. 4 illustrates structure of a laminated core of an example embodiment of the present disclosure.

FIG. 4 illustrates structure of the laminated core 21. Description of FIG. 4 will be with reference to FIGS. 2 and 3 as appropriate.

The laminated core 21 is formed by, for example, stacking vertically a predetermined number of thin steel plates 21a each of which has a thickness of 0.02 to 1 mm, and has a surface with a baked insulating varnish or the like and a hole formed at the center of the surface. The steel plates 21a are bonded to each other, and the entire laminated core 21 is handled as one part at the time of assembling the rotor 20 or the like. The laminated core 21 corresponds to an example of a laminated body defined by stacking a plurality of magnetic bodies each having an annular and plate shape. The steel plates 21a stacked as the laminated core 21 are each thin, and thus are desired to be protected from being peeled or distorted when the shaft 22 is press-fitted. When the steel plate 21a has a thickness of 0.35 mm or less, damage is particularly likely to occur, and thus protection is required. The upper flange 25 and the lower flange 26 described above are stacked on the laminated core 21 in the stacking direction of the steel plates 21a and hold the laminated core 21, thereby protecting the laminated core 21.

The cylindrical portion 23 of the laminated core 21 is provided with a through-hole 23d into which the shaft 22 is press-fitted. The through-hole 23d includes inner peripheral surfaces 23a and 23b, and the inner peripheral surface 23a close to an entrance of the through-hole 23d has a larger inner diameter than the inner peripheral surface 23b of a recessed portion of the through-hole 23d. The inner diameter of the inner peripheral surface 23b of the recessed portion is substantially equal to an outer diameter of the shaft 22. The inner peripheral surfaces 23a and 23b of the through-hole 23d in the laminated core 21 correspond to an example of an opposing peripheral surface according to the present disclosure. The opposing peripheral surface is at least one of an inner peripheral surface and an outer peripheral surface of the laminated body according to the present disclosure, and corresponds to the inner peripheral surface when the laminated core 21 is provided in the rotor 20. The shaft 22 corresponds to an example of an extended body according to the present disclosure that extends along a stacking direction of the magnetic bodies in the laminated body according to the present disclosure.

The laminated core 21 is provided in its upper and lower surfaces with positioning holes 23c formed surrounding the through-hole 23d. The positioning holes 23c each have a depth corresponding to a thickness of several steel plates 21a, and are each a bottomed hole.

Figure 5:
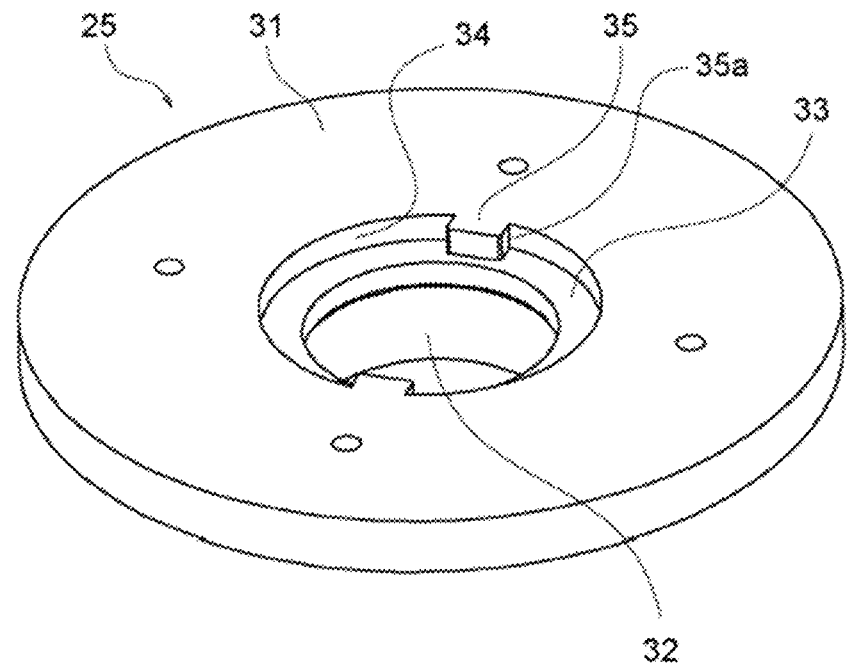
FIG. 5 is an upper perspective view illustrating detailed structure of an upper flange of an example embodiment of the present disclosure.
Figure 6:
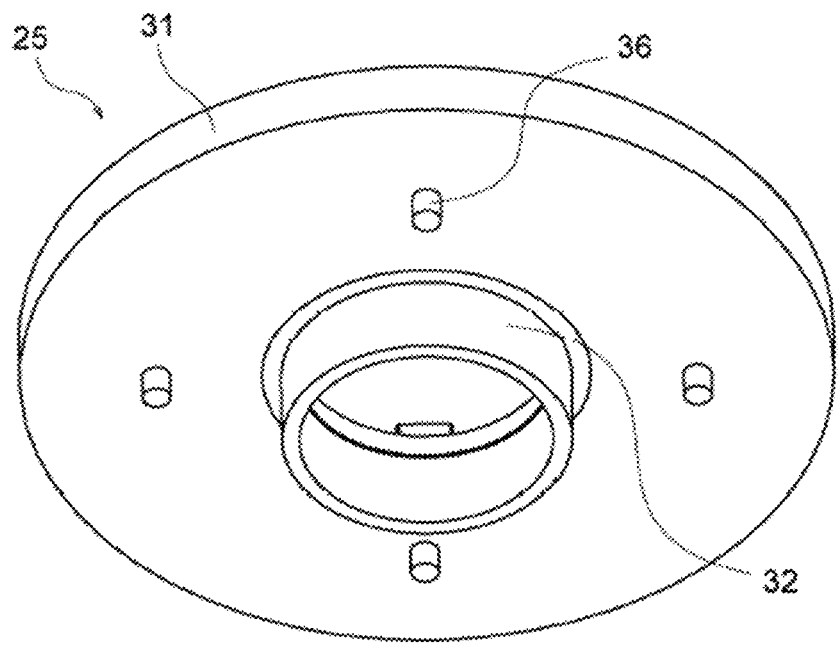
FIG. 6 is a lower perspective view illustrating detailed structure of an upper flange of an example embodiment of the present disclosure.

FIGS. 5 and 6 each illustrate detailed structure of the upper flange 25. FIG. 5 illustrates an upper perspective view, and FIG. 6 illustrates a lower perspective view. Description of FIGS. 5 and 6 will be with reference to FIGS. 2, 3, and 4 as appropriate.

The upper flange 25 is made of a magnetic metal or a nonmagnetic metal. The upper flange 25 includes a plate portion 31 having higher rigidity than the steel plate 21a of the laminated core 21 and a cylindrical portion 32 extending along the inner peripheral surface 23a of the laminated core 21. The plate portion 31 has a larger plate thickness than the steel plate 21a, for example, and thus has high rigidity. The plate portion 31 is formed of, for example, a material having higher rigidity than the steel plate 21a. The cylindrical portion 32 is formed by, for example, burring.

The cylindrical portion 32 has an inner diameter that is substantially equal to the outer diameter of the shaft 22 and the inner diameter of the inner peripheral surface 23b of the recessed portion of the laminated core 21. The cylindrical portion 32 has an outer diameter that is substantially equal to the inner diameter of the inner peripheral surface 23a of an entrance portion of the laminated core 21. The cylindrical portion 32 has a length that is substantially equal to a length of the inner peripheral surface 23a of the entrance portion of the laminated core 21. Thus, when the upper flange 25 is stacked on the laminated core 21, the cylindrical portion 32 of the upper flange 25 is fitted to the inner peripheral surfaces 23a and 23b of the laminated core 21 to form a continuous inner peripheral surface having a cylindrical shape with no step. The shaft 22 is press-fitted into the inner peripheral surface continuous as described above.

The plate portion 31 is connected to the cylindrical portion 32 with an edge portion 33 formed by, for example, half blanking, and the edge portion 33 is positioned below other portions of the plate portion 31 (i.e., positioned close to the laminated core 21). As a result, the plate portion 31 includes a shoulder surface 34 in an arc shape that is generated between the edge portion 33 and the other portions. The shoulder surface 34 faces inward. The edge portion 33 corresponds to an example of an adjacent portion of the plate portion that is adjacent to the extended body according to the present disclosure.

The edge portion 33 is partially provided with a key portion 35 remaining without being subjected to the half blanking. Processing the key portion 35 simultaneously with the edge portion 33 reduces man-hours. The key portion 35 has a side surface 35a that is a shoulder surface opposing a circumferential direction on the inner peripheral surface 23a of the laminated core 21. The side surface 35a of the key portion 35 is also a shoulder surface opposing a circumferential direction on an outer peripheral surface of the shaft 22 inserted into the laminated core 21. The key portion 35 corresponds to an example of a protrusion according to the present disclosure that protrudes from the adjacent portion along the extended body and comes into contact with a second shoulder surface.

The plate portion 31 is provided on its lower surface (i.e., a surface close to the laminated core 21) with dowels 36 formed by, for example, half blanking. When the upper flange 25 is stacked on the laminated core 21, the dowels 36 enter the corresponding positioning holes 23c formed in the laminated core 21 to position the upper flange 25 with respect to the laminated core 21.

Figure 7:
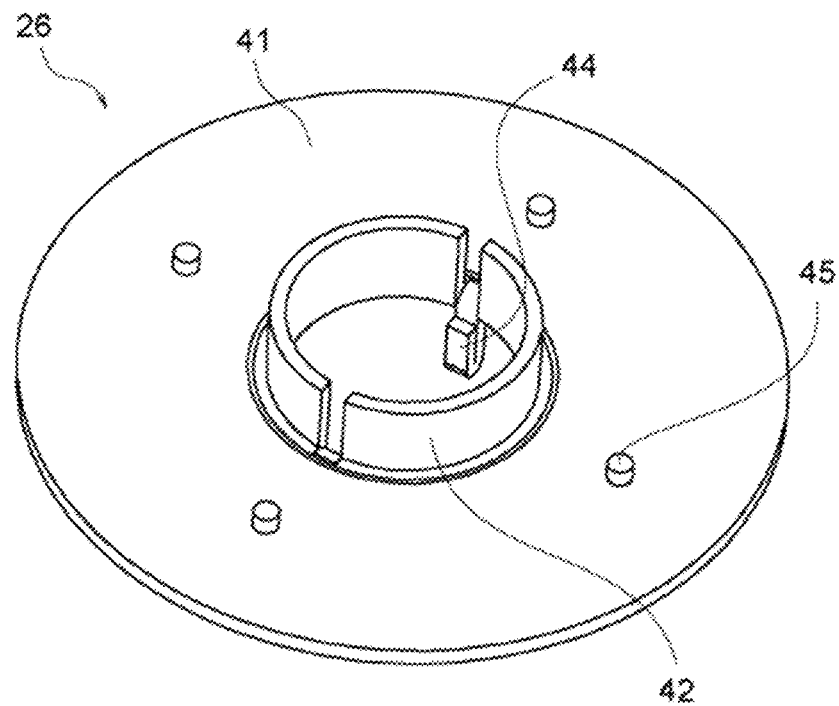
FIG. 7 is an upper perspective view illustrating detailed structure of a lower flange of an example embodiment of the present disclosure.
Figure 8:
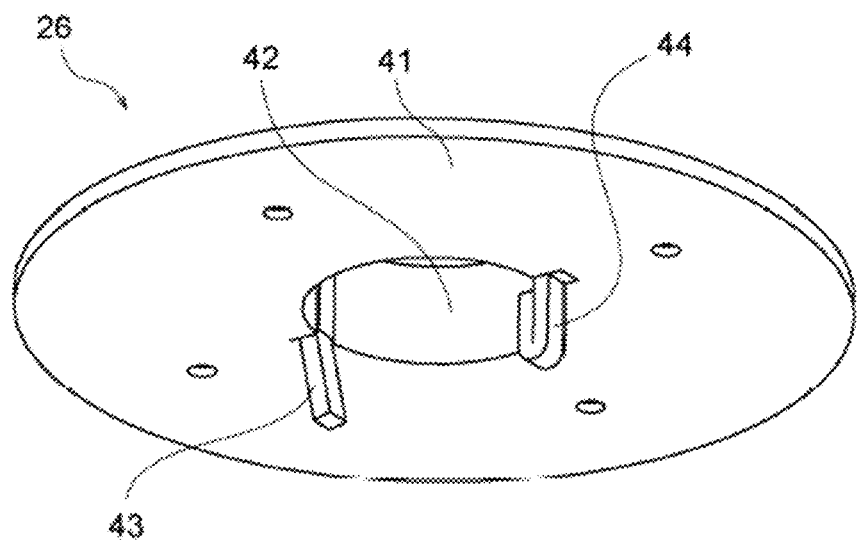
FIG. 8 is a lower perspective view illustrating detailed structure of a lower flange of an example embodiment of the present disclosure.

FIGS. 7 and 8 each illustrate detailed structure of the lower flange 26. FIG. 7 illustrates an upper perspective view, and FIG. 8 illustrates a lower perspective view. Description of FIGS. 7 and 8 will be with reference to FIGS. 2, 3, and 4 as appropriate.

The lower flange 26 is made of a magnetic metal or a nonmagnetic metal. The lower flange 26 includes a plate portion 41 having higher rigidity than the steel plate 21a of the laminated core 21 and a cylindrical portion 42 extending along the inner peripheral surface 23a of the laminated core 21. The cylindrical portion 42 is formed by, for example, burring.

The plate portion 41 is provided on its upper surface (i.e., a surface close to the laminated core 21) with dowels 45 formed by, for example, half blanking. When the lower flange 26 is stacked on the laminated core 21, the dowels 45 enters the corresponding positioning holes 23c formed in the laminated core 21 to position the lower flange 26 with respect to the laminated core 21.

A part of the cylindrical portion 42 extending upward (i.e., toward the inside of the laminated core 21) in the circumferential direction is bent downward (i.e., toward a side opposite to the laminated core 21). In the example shown here, for example, two portions are bent to form a first protrusion 43 and a second protrusion 44. The first protrusion 43 is formed by, for example, so-called right-angle bending, but is slightly inclined with respect to immediately below (i.e., an extending direction of the shaft 22). The first protrusion 43 has a leading end located closer to the center of the lower flange 26 (i.e., closer to the shaft 22) than its root. The second protrusion 44 is formed by, for example, so-called hemming bending. The second protrusion 44 has a root portion extending downward and is folded upward from the middle. In the following description, this folded portion (i.e., a lowermost portion of the second protrusion 44) is referred to as a leading end of the second protrusion 44.

Figure 9:
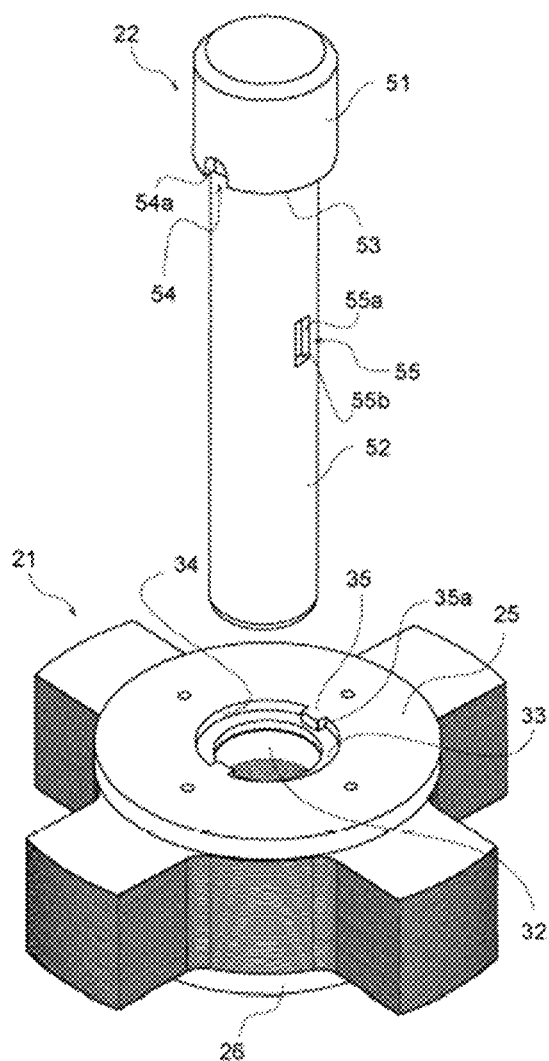
FIG. 9 illustrates detailed structure of a shaft to illustrate an assembling procedure of a rotor of an example embodiment of the present disclosure.

FIG. 9 illustrates detailed structure of the shaft 22 to illustrate an assembly procedure of the rotor 20.

The shaft 22 includes a head portion 51 and a body portion 52. The head portion 51 is thicker (larger in diameter) than the body portion 52, and the head portion 51 protrudes toward an outer peripheral side from the body portion 52. As a result, a shoulder surface 53 facing downward (i.e., toward a direction in which the body portion 52 extends) is formed at a boundary between the head portion 51 and the body portion 52.

The head portion 51 has an outer diameter that is substantially equal to an inner diameter of the shoulder surface 34 in an arc shape of the upper flange 25. The body portion 52 has an outer diameter that is substantially equal to an inner diameter of the cylindrical portion 32 of the upper flange 25.

The head portion 51 includes a key groove 54 recessed at a portion in its circumferential direction and adjacent to the body portion 52. The key groove 54 forms a step from an outer periphery of the head portion 51. As a result, the key groove 54 has a shoulder surface 54a opposing the circumferential direction.

The body portion 52 includes a stop groove 55 for retaining at a portion in its extending direction. The stop groove 55 is circumferentially provided at, for example, two places. The stop groove 55 forms a step from an outer peripheral surface of the body portion 52, and includes a shoulder surface 55b facing upward and a shoulder surface 55a facing circumferentially. The shoulder surfaces 55a and 55b of the stop groove 55 are recessed from the surface of the shaft 22, and thus do not interfere with press-fitting of the shaft 22 to facilitate the press-fitting.

As the assembly procedure of the rotor 20, first, the upper flange 25 and the lower flange 26 are stacked on upper and lower surfaces of the laminated core 21, respectively, and the laminated core 21 is held by the upper flange 25 and the lower flange 26. The cylindrical portions 32 and 42 provided in the upper flange 25 and the lower flange 26, respectively, are inserted into the through-hole 23d (see FIG. 4) of the laminated core 21, and then the dowels 36 and 45 (see FIGS.

6 and 7) provided on the upper flange 25 and the lower flange 26, respectively, are inserted into the corresponding positioning holes 23c (see FIG. 4) of the laminated core 21.

Next, the shaft 22 is press-fitted in a direction in which the key groove 54 and the key portion 35 of the upper flange 25 are aligned with each other, and then the shaft 22 is press-fitted into the laminated core 21 held by the upper flange 25 and the lower flange 26. When the shaft 22 is press-fitted, the key portion 35 engages with the key groove 54 to prevent rotation of the shaft 22, the upper flange 25, and the laminated core 21. That is, the shaft 22 comes into contact with the shoulder surface 35a of the key portion 35 (i.e., a part of the upper flange 25) at the shoulder surface 54a (i.e., the shoulder surface opposing the circumferential direction around the inner peripheral surface 23a of the laminated core 21, which is an example of the opposing peripheral surface) of the key groove 54, and then the shaft 22 is positioned in the circumferential direction. The key portion 35 protrudes from the edge portion 33 along the shaft 22 and comes into contact with the shoulder surface of the key groove 54, and thus reliably prevents rotation of the shaft 22.

Figure 10:
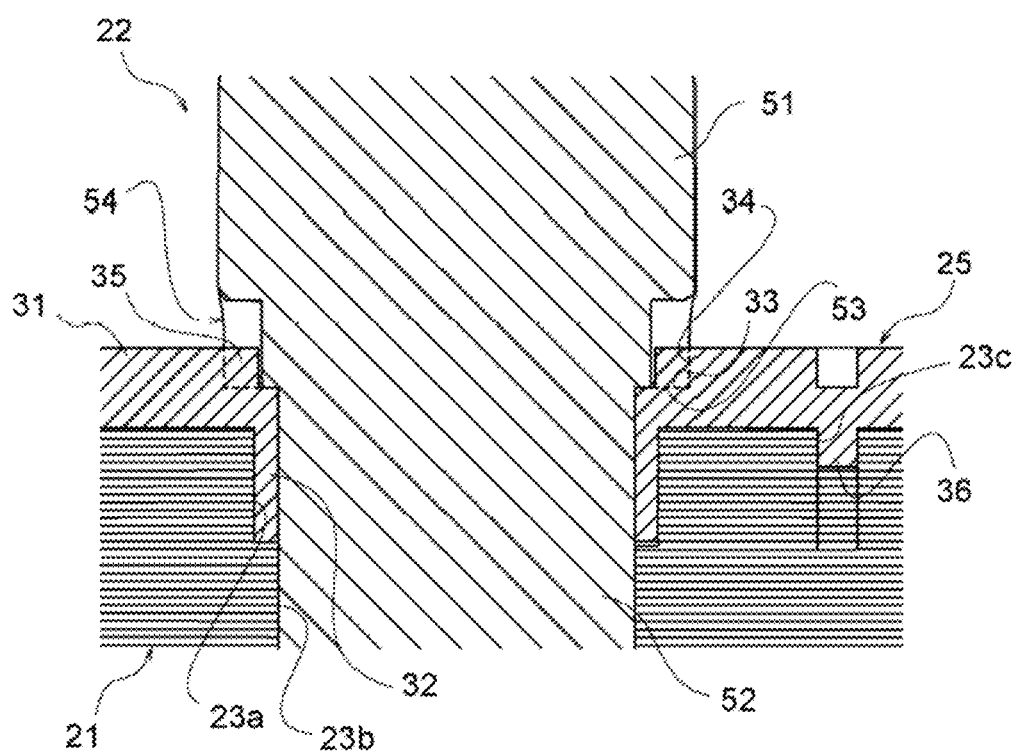
FIG. 10 is an enlarged sectional view illustrating a contact portion between an upper flange and a shaft of an example embodiment of the present disclosure.

FIG. 10 is an enlarged sectional view illustrating a contact portion between the upper flange 25 and the shaft 22.

When the dowels 36 (i.e., protrusions to be fitted into recesses) of the upper flange 25 are fitted into the corresponding positioning holes 23c of the laminated core 21 (i.e., recesses provided in a surface opposing the plate portion 31), the upper flange 25 and the laminated core 21 are positioned to each other.

As described above, when the key groove 54 of the head portion 51 of the shaft 22 engages with the key portion 35 of the upper flange 25, the shaft 22 is positioned in the circumferential direction.

When the body portion 52 of the shaft 22 is press-fitted into the upper flange 25 and the laminated core 21, the cylindrical portion 32 of the upper flange 25 is pushed from its inner peripheral side toward its outer peripheral side by the body portion 52. As a result, an inner peripheral surface of the cylindrical portion 32 is in close contact with the outer peripheral surface of the shaft 22, and an outer peripheral surface of the cylindrical portion 32 is in close contact with the inner peripheral surface 23a of the laminated core 21. Beyond the cylindrical portion 32 of the upper flange 25, the outer peripheral surface of the body portion 52 of the shaft 22 comes into close contact with the inner peripheral surface 23b of the laminated core 21. The cylindrical portion 32 corresponds to an example of a sleeve portion according to the present disclosure that expands by coming into contact with the extended body according to the present disclosure.

The plate portion 31 of the upper flange 25 extends along the laminated core 21 and has higher rigidity than the steel plates 21a of the laminated core 21. Thus, the plate portion 31 prevents the steel plates 21a from peeling or the like when the shaft 22 is press-fitted. The cylindrical portion 32 of the upper flange 25 expands by coming into contact with the shaft 22 and extends from the plate portion 31 toward the laminated core 21. Thus, the cylindrical portion 32 suppresses distortion or the like of the steel plate 21a when the shaft 22 is press-fitted.

The shaft 22 is press-fitted until the shoulder surface 53 facing downward formed between the head portion 51 and the body portion 52 comes into contact with the edge portion 33 of the upper flange 25. As a result, the shaft 22 is positioned in the extending direction by using a so-called stopper. In other words, the shaft 22 is positioned in the extending direction in contact with the upper flange 25 at the shoulder surface 53 opposing the extending direction of the shaft 22. The shoulder surface 53 is in contact with the edge portion 33 of the plate portion 31 of the upper flange 25, adjacent to the shaft 22, so that the shoulder surface for positioning has a simple structure. The shaft 22 is positioned in the extending direction even when the edge portion 33 is flush with other portions of the plate portion 31 without having a step due to half-blanking or the like.

When the edge portion 33 has a step from the other portions of the plate portion 31 as illustrated in FIG. 5, i.e., when the edge portion 33 is positioned closer to the laminated core 21 than the other portions to form a step between the edge portion 33 and the other portions, an outer peripheral surface of the head portion 51 comes into contact with the shoulder surface 34 in an arc shape facing inward of the upper flange 25 by press fitting of the shaft 22. This achieves so-called axial alignment of the shaft 22.

As described above, when the shaft 22 is inserted (press-fitted) into the upper flange 25, the shoulder surface 53 facing downward of the shaft 22 comes into contact with the upper flange 25 to be positioned in the extending direction, and the shoulder surface 54a opposing the circumferential direction comes into contact with the upper flange 25 to be positioned in the circumferential direction. That is, the shaft 22 is positioned in both the extending direction and the circumferential direction by press fitting of the shaft 22. When the shaft 22 is press-fitted into the upper flange 25, axial alignment of the shaft 22 is also achieved. That is, even a small number of members achieves the protection of the steel plates 21a of the laminated core 21 and the positioning of the shaft 22.

Figure 11:
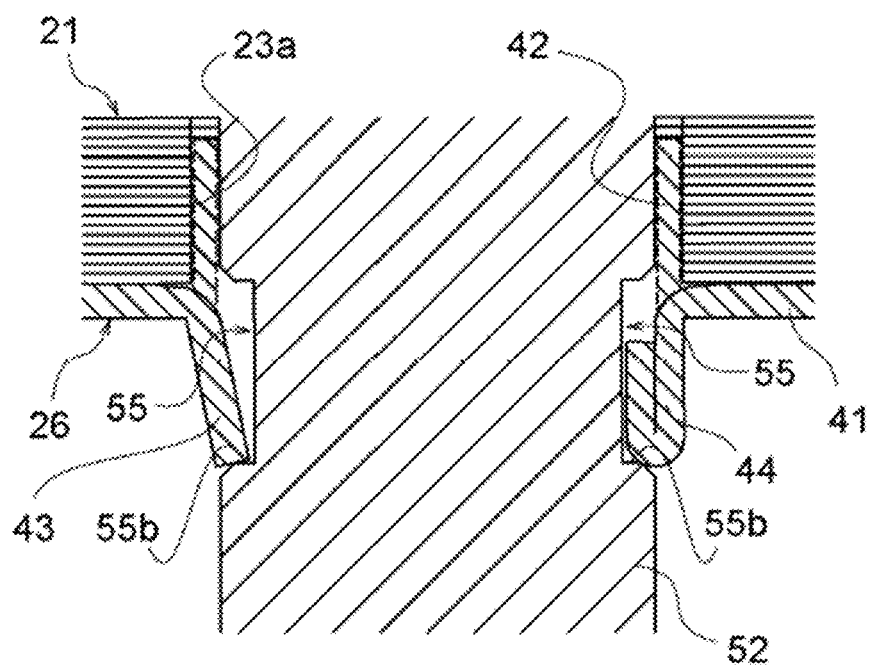
FIG. 11 is an enlarged sectional view illustrating a contact portion between a lower flange and a shaft of an example embodiment of the present disclosure.

FIG. 11 is an enlarged sectional view illustrating a contact portion between the lower flange 26 and the shaft 22.

When the body portion 52 of the shaft 22 is press-fitted into the lower flange 26 and the laminated core 21, the cylindrical portion 42 of the lower flange 26 is pushed from its inner peripheral side to its outer peripheral side by the body portion 52 to bring an outer peripheral surface of the cylindrical portion 42 into close contact with the inner peripheral surface 23a of the laminated core 21. Then, an inner peripheral surface of the cylindrical portion 42 comes into close contact with the body portion 52 of the shaft 22. The cylindrical portion 42 corresponds to an example of the sleeve portion according to the present disclosure that expands by coming into contact with the extended body according to the present disclosure. The laminated core 21 is protected by the plate portion 41 and the cylindrical portion 42 of the lower flange 26, so that peeling or distortion of the steel plates 21a does not occur in the laminated core 21 even when the shaft 22 is press-fitted.

When the shaft 22 is fully press-fitted as illustrated in FIG. 10, each of the stop grooves 55 of the body portion 52 of the shaft 22 reaches the corresponding one of the first protrusion and the second protrusion 44 of the lower flange 26 as illustrated in FIG. 11. The leading end of the first protrusion 43 inclined inward is temporarily and elastically expanded by the outer peripheral surface of the body portion 52. When the shoulder surface 55b facing upward of the stop groove 55 reaches the leading end of the first protrusion 43, the first protrusion 43 is fitted into the stop groove 55 by an elastic force.

As a result, the leading end of the first protrusion 43 comes into contact with the shoulder surface 55b facing upward of the stop groove 55 to prevent the shaft 22 from coming off, and the shaft 22 is positioned in the extending direction. Then, a side surface of the first protrusion 43 comes into contact with the shoulder surface 55a (see FIG.

9) opposing the circumferential direction of the stop groove 55 to prevent rotation of the shaft 22, and the shaft 22 is positioned in the circumferential direction. As described above, inserting (press-fitting) the shaft 22 into the lower flange 26 facilitates positioning of the shaft 22 in both the extending direction and the circumferential direction.

The second protrusion 44 of the lower flange 26 is pushed into the stop groove 55 by crimping after completion of press fitting of the shaft 22. As a result, the leading end of the second protrusion 44 comes into contact with the shoulder surface 55b facing upward of the stop groove 55 to prevent the shaft 22 from coming off. Then, a side surface of the second protrusion 44 comes into contact with the shoulder surface 55a (see FIG. 9) opposing the circumferential direction of the stop groove 55 to prevent rotation of the shaft 22. The second protrusion 44 has a structure folded back by so-called hemming bending, and thus has high strength.

Next, a motor armature of a second example embodiment of the present disclosure will be described.

Figure 12:
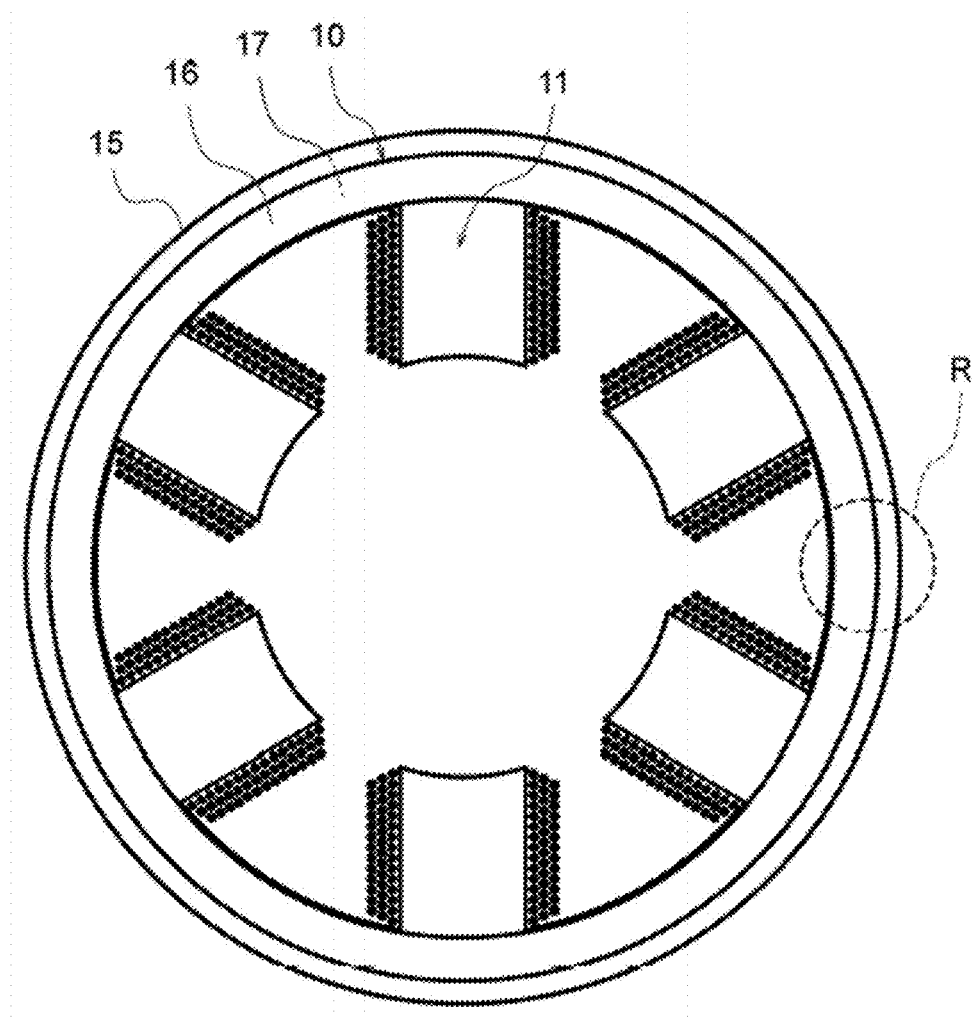
FIG. 12 illustrates a motor armature of a second example embodiment of the present disclosure.

FIG. 12 illustrates the motor armature of the second example embodiment of the present disclosure.

As described above, the combination of the stator 10 and the case 15 of the motor 100 illustrated in FIG. 1 is the motor armature of the second example embodiment of the present disclosure.

The laminated core 11 of the stator 10 is press-fitted into the cylindrical case 15, and the upper flange 16 and the lower flange 17 hold the laminated core 11 from above and below, respectively, to protect the laminated core 11. The case 15 extends vertically along an outer peripheral surface of the laminated core 11. The motor armature according to the second example embodiment includes the laminated core 11 that corresponds to an example of the laminated body according to the present disclosure. The outer peripheral surface of the laminated core 11 corresponds to an example of the opposing peripheral surface according to the present disclosure, and the case 15 corresponds to an example of the extended body according to the present disclosure.

Figure 13:
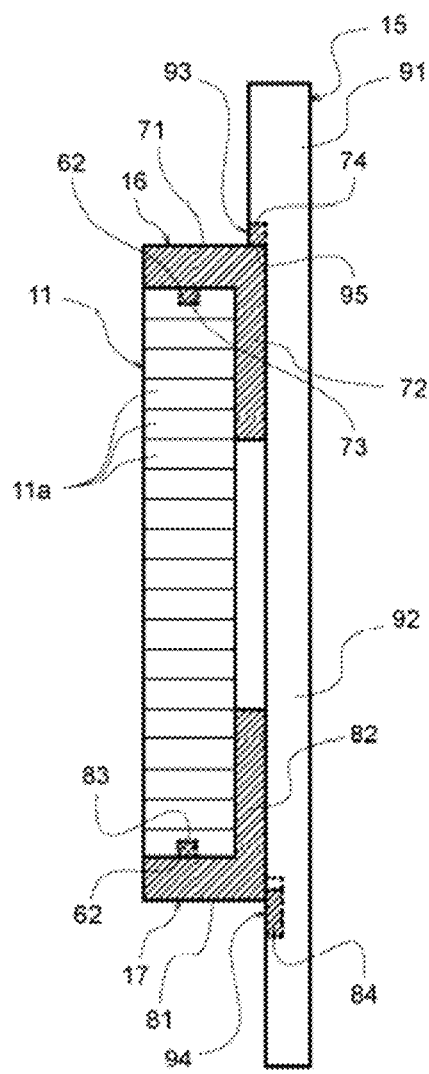
FIG. 13 is an enlarged sectional view of a region R in FIG. 12.

FIG. 13 is an enlarged sectional view of a region R in FIG. 12. However, FIG. 13 illustrates a schematic view, and in particular, steel plates 11a constituting the laminated core 11 are each drawn thicker than an actual steel plate.

The laminated core 11 of the stator 10 is formed by, for example, stacking vertically the steel plates 11a each of which is thin and has a thickness of 0.02 to 1 mm and an annular shape, and has a surface with a baked insulating varnish or the like. The steel plates 21a are bonded to each other, and the entire laminated core 21 is handled as one part at the time of assembling the rotor 20 or the like. The laminated core 21 corresponds to an example of the laminated body according to the present disclosure, defined by stacking a plurality of magnetic bodies each having an annular and plate shape.

The upper flange 16 and the lower flange 17 are stacked on the laminated core 11 in a stacking direction of the steel plates 11a and hold the laminated core 11, thereby protecting the laminated core 11. Each of the upper flange 16 and the lower flange 17 corresponds to an example of the holder according to the present disclosure that is stacked on the laminated body in the stacking direction and holds the laminated body.

The upper flange 16 includes a plate portion 71 having higher rigidity than the steel plate 11a of the laminated core 11 and a cylindrical portion 72 extending along the outer peripheral surface of the laminated core 11. The lower flange 17 also includes a plate portion 81 having higher rigidity than the steel plate 11a of the laminated core 11 and a cylindrical portion 82 extending along the outer peripheral surface of the laminated core 11. The cylindrical portions 72 and 82 of the upper flange 16 and the lower flange 17 each have an inner diameter that is substantially equal to an outer diameter of the outer peripheral surface of the laminated core 11.

The laminated core 11 is provided in its upper and lower surfaces with positioning holes 62. The positioning holes 62 are each a bottomed hole. Then, the plate portions 71 and 81 of the upper flange 16 and the lower flange 17 are respectively provided close to the laminated core 11 with dowels 73 and 83. These dowels are inserted into the respective positioning holes 62 of the laminated core 11 to position the upper flange 16 and the lower flange 17 with respect to the laminated core 11.

The case 15 includes a relatively thick upper portion 91 and a relatively thin lower portion 92, and a shoulder surface 95 facing downward is formed between the upper portion 91 and the lower portion 92. The lower portion 92 of the case 15 has an inner diameter that is substantially equal to an outer diameter of each of the cylindrical portions 72 and 82 of the upper flange 16 and the lower flange 17.

Before the laminated core 11 is press-fitted into the case 15, the laminated core 11 is sandwiched and held by the upper flange 16 and the lower flange 17 from above and below, respectively.

Then, the laminated core 11 held by the upper flange 16 and the lower flange 17 is press-fitted into the case 15. When the laminated core 11 is press-fitted, the cylindrical portions 72 and 82 of the upper flange 16 and the lower flange 17 are pushed inward by an inner peripheral surface of the lower portion 92 of the case 15. As a result, outer peripheral surfaces of the cylindrical portions 72 and 82 come into close contact with an inner peripheral surface of the case 15, and inner peripheral surfaces thereof come into close contact with the outer peripheral surface of the laminated core 11. The cylindrical portions 72 and 82 each correspond to an example of the sleeve portion according to the present disclosure that extends in contact with the extended body according to the present disclosure.

The laminated core 11 is sandwiched and protected by the upper flange 16 and the lower flange 17, so that peeling or distortion of the steel plates 11a does not occur in the laminated core 11 even when the laminated core 11 is press-fitted into the case 15. The laminated core 11 is press-fitted until the plate portion 71 of the upper flange 16 comes into contact with the shoulder surface 95 of the case 15. The case 15 is positioned in the vertical direction (i.e., an extending direction of the case 15) by contact between the plate portion 71 of the upper flange 16 and the shoulder surface 95 of case 15. The plate portion 71 has a portion in contact with the shoulder surface 95, the portion corresponding to an example of the adjacent portion according to the present disclosure of the plate portion, the adjacent portion being adjacent to the extended body.

The plate portion 71 of the upper flange 16 is partially provided on its outer periphery with a key portion 74 protruding upward. Then, the upper portion 91 of the case 15 is provided with a key groove 93 recessed upward that is formed at a part of a boundary between the upper portion 91 and the lower portion 92, in the circumferential direction. When the laminated core 11 is press-fitted, the key portion 74 is fitted into the key groove 93 to achieve so-called anti-rotation by contact between a side surface of the key portion 74 and an inner wall of the key groove 93, and the case 15 is positioned in the circumferential direction. The key portion 74 corresponds to an example of the protrusion according to the present disclosure that protrudes from the adjacent portion along the extended body and comes into contact with the second shoulder surface.

The lower flange 17 is provided with a protrusion 84 protruding downward. Then, the lower portion 92 of the case 15 is provided with a stop groove 94 into which the protrusion 84 is fitted. After the laminated core 11 is press-fitted, the protrusion 84 is pushed into the stop groove 94 by, for example, crimping, and a leading end and a side surface of the protrusion 84 come into contact with an inner wall surface facing upward and an inner wall surface opposing a circumferential direction of the stop groove 94, respectively. The inner wall surfaces of the stop groove 94 are each a shoulder surface with respect to the inner peripheral surface of the lower portion 92.

The contact between the leading end of the protrusion 84 and the inner wall surface of the stop groove 94 achieves so-called retaining, and the case 15 is positioned in the vertical direction (i.e., the extending direction of the case 15). Then, the contact between the side surface of the protrusion 84 and the inner wall surface of the stop groove 94 achieves so-called anti-rotation, and the case 15 is positioned in the circumferential direction.

As described above, inserting (press-fitting) the laminated core 11 into the case 15 easily achieves positioning in both the extending direction and the circumferential direction of the case 15.

Next, a modification of the rotor 20 described above will be described.

Figure 14:
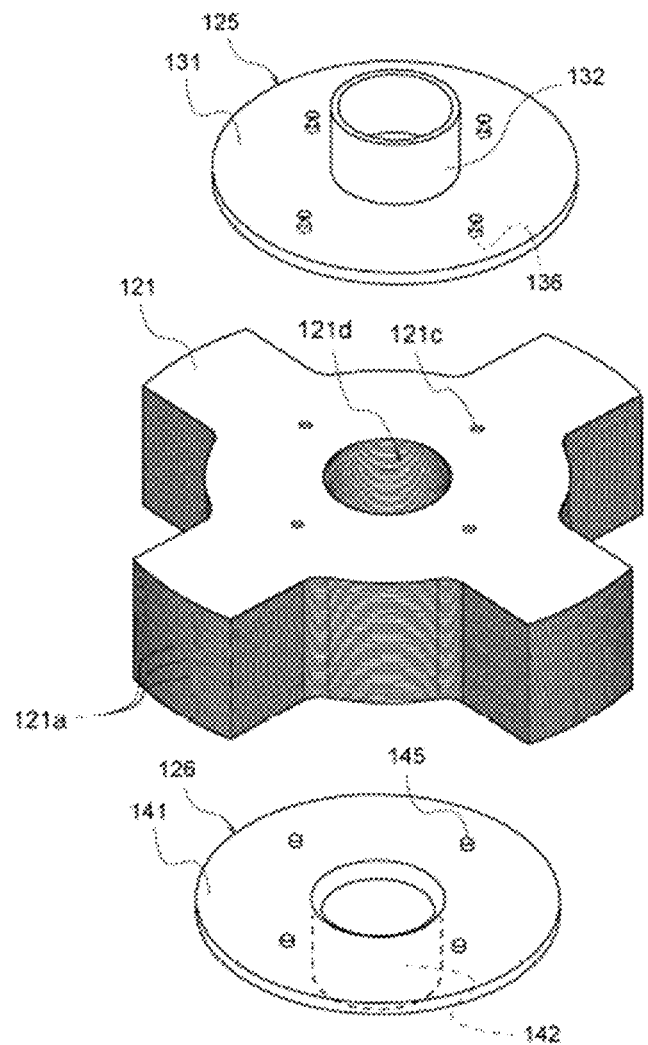
FIG. 14 illustrates an upper flange, a lower flange, and a laminated core in a rotor of a modification of an example embodiment of the present disclosure.

FIG. 14 illustrates an upper flange, a lower flange, and a laminated core in a rotor of the modification.

Even in the modification, a laminated core 121 defined by stacking steel plates 121a is used, and the laminated core 121 is provided in its upper and lower surfaces with positioning holes 121c. Even in the modification, an upper flange 125 and a lower flange 126 include plate portions 131 and 141, and cylindrical portions 132 and 142, respectively. The plate portions 131 and 141 are each provided on its surface close the laminated core 121 with dowels 136 and 145, respectively, which are formed by half-blanking, for example.

The cylindrical portions 132 and 142 of the upper flange 125 and the lower flange 126 of the modification extend toward a side opposite to the laminated core 121. The laminated core 121 is provided with a through-hole 121d that has a constant inner diameter over the entire length. The through-hole 121d has an inner diameter that is substantially equal to an inner diameter of each of the cylindrical portions 132 and 142.

Prior to press-fitting of a shaft to be described later, the laminated core 121 is sandwiched and held by the upper flange 125 and the lower flange 126 from above and below, respectively. At this time, the dowels 136 and 145 of the upper flange 125 and the lower flange 126 enter the corresponding positioning holes 121c of the laminated core 121 to position the upper flange 125 and the lower flange 126 with respect to the laminated core 121.

Figure 15:
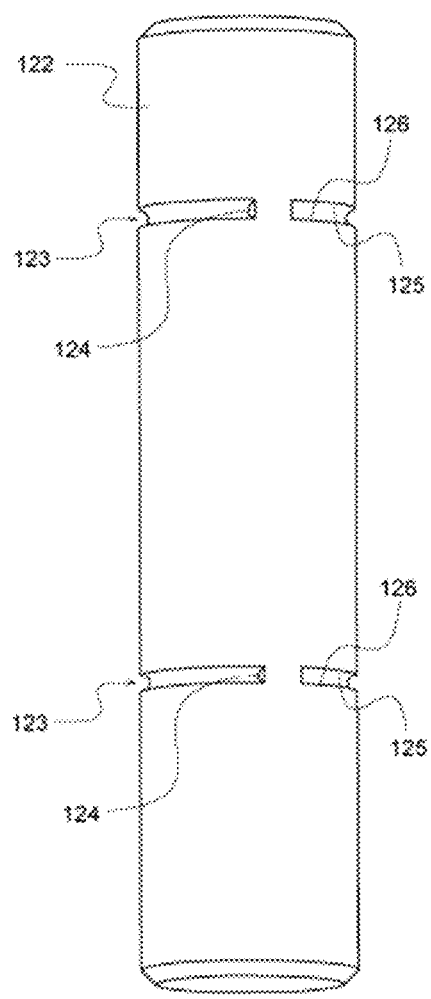
FIG. 15 illustrates a shaft in a modification of an example embodiment of the present disclosure.

FIG. 15 illustrates a shaft in the modification.

The shaft 122 in the modification is provided in its outer peripheral surface with a crimping groove 123 extending in a circumferential direction. The crimping groove 123 forms a step with respect to the outer peripheral surface of the shaft 122, and includes a shoulder surface 125 facing downward and a shoulder surface 126 facing upward as shoulder surfaces opposing an extending direction of the shaft 122.

The crimping groove 123 is partially disconnected to form a shoulder surface 124 opposing the circumferential direction of the shaft 122.

Figure 16:
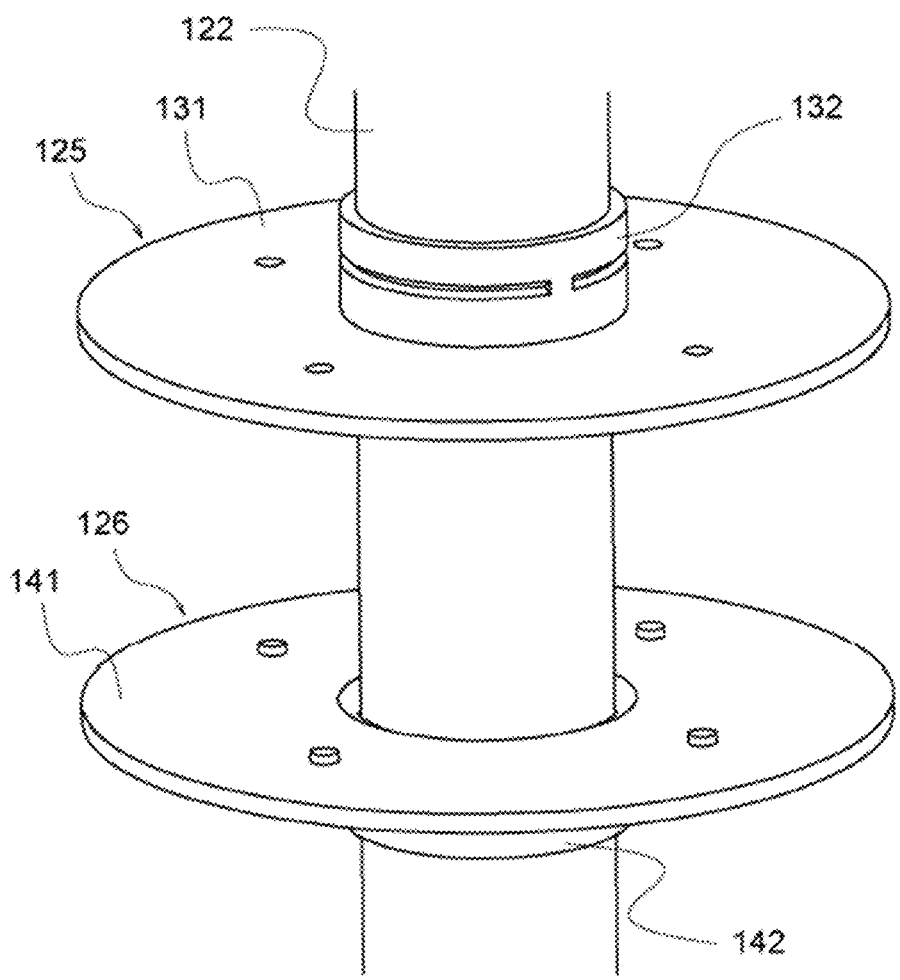
FIG. 16 illustrates a state in which a shaft of an example embodiment of the present disclosure is press-fitted.

FIG. 16 illustrates a state in which the shaft 122 is press-fitted. However, FIG. 16 does not illustrate the laminated core 121, and thus description of FIG. 16 is also with reference to FIG. 14. The description of FIG. 16 is also with reference to FIG. 15 without particularly denoting the figure number.

When the laminated core 121 is sandwiched between the upper flange 125 and the lower flange 126 as described above, the shaft 122 is then press-fitted into the laminated core 12 held by the upper flange 125 and the lower flange 126. The laminated core 121 is protected by the plate portions 131 and 141 of the upper flange 125 and the lower flange 126, so that peeling or distortion of the steel plates 121a does not occur even when the shaft 122 is press-fitted.

The shaft 122 is press-fitted to a position where crimping grooves 123 overlaps the corresponding cylindrical portions 132 and 142 of the upper flange 125 and the lower flange 126, and then the cylindrical portions 132 and 142 are crimped and pushed into the corresponding crimping grooves 123. Then, both the shoulder surface 124 facing circumferentially and the shoulder surfaces 125 and 126 facing vertically of each of the crimping grooves 123 come into close contact with the corresponding one of the cylindrical portions 132 and 142. As a result, the shaft 122 is positioned in both the extending direction and the circumferential direction.

As described above, a rotor is assembled by press-fitting the shaft 122 and crimping the cylindrical portions 132 and 142 in the modification.

Next, modifications of the upper flange 25 and the lower flange 26 will be described.

Figure 17:
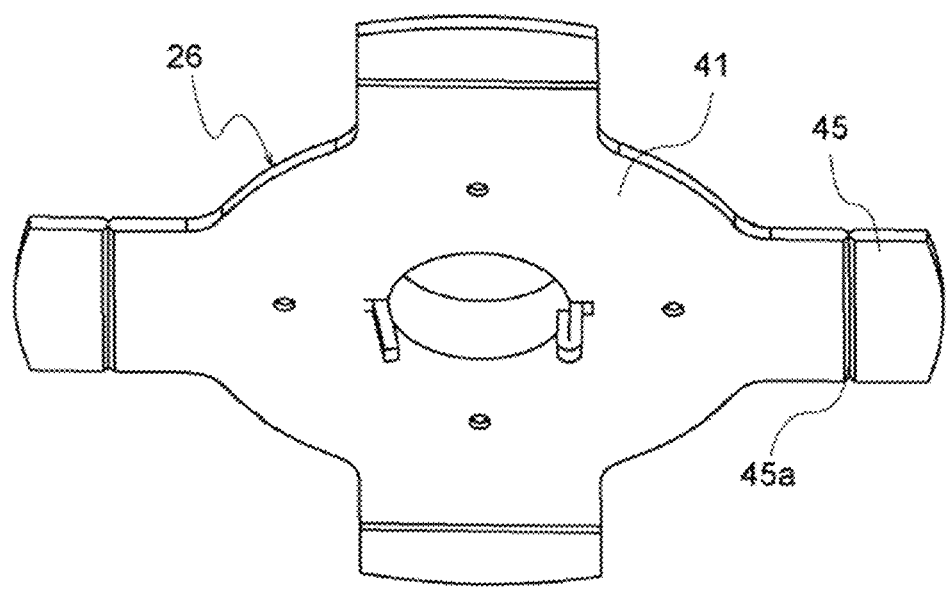
FIG. 17 illustrates a modification of a flange of an example embodiment of the present disclosure.

FIG. 17 illustrates a modification of a flange.

Although FIG. 17 illustrates application of the modification to the lower flange 26 as an example, this modification is similarly applicable to the upper flange 25. That is, the lower flange 26 in the modification includes a plate portion 41 that is partially provided with an extended portion 45 extending in a direction away from the shaft 22. For example, extended portions 45 here extend in four directions. When the lower flange 26 is stacked on the laminated core 21, the extended portions 45 overlies respective four salient poles 24 provided in the laminated core 21 to protect the salient poles 24. This protects the salient poles 24 at the time of press-fitting work or the like, and prevents peeling or distortion of the steel plates 21a.

The extended portions 45 are each provided with a breaking groove 45a having a V-shape in section, and a leading end portion beyond the breaking groove 45a of each of the extended portions 45 is removed after the shaft 22 is press-fitted.

Figure 18:
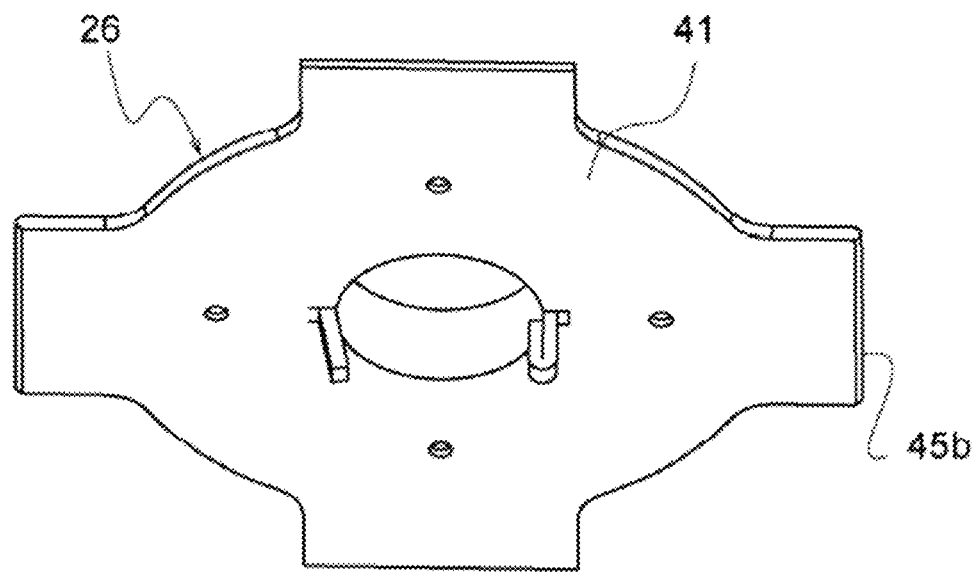
FIG. 18 illustrates a state of an example embodiment of the present disclosure after an extended portion is broken.

FIG. 18 illustrates a state after the extended portions 45 are broken.

The presence of the extended portions 45 facilitates handling of the laminated core 21 and the like at the time of press-fitting work and the like, and the extended portions 45 contribute to protection of the laminated core 21. In contrast, a structure with the laminated core 21 covered with a resin insulator does not need the extended portions 45. The extended portions 45 may cause an eddy current to deteriorate motor efficiency.

Thus, the extended portions 45 are each bent and broken at a location of the breaking groove 45a (see FIG. 17), and the leading end portion beyond the breaking groove 45a is removed. The plate portion 41 of the lower flange 26 after the removal has a fracture surface 45b at a portion of an edge away from the shaft (i.e., a portion at which the leading end portion of each of the extended portions 45 is removed). Each of the extended portions 45 may be broken at its root to remove the entire extended portion 45.

Next, a motor with an outer rotor will be described as an example of a motor to which the structure of motor components according to the first example embodiment or the second example embodiment of the present disclosure is applicable.

Figure 19:
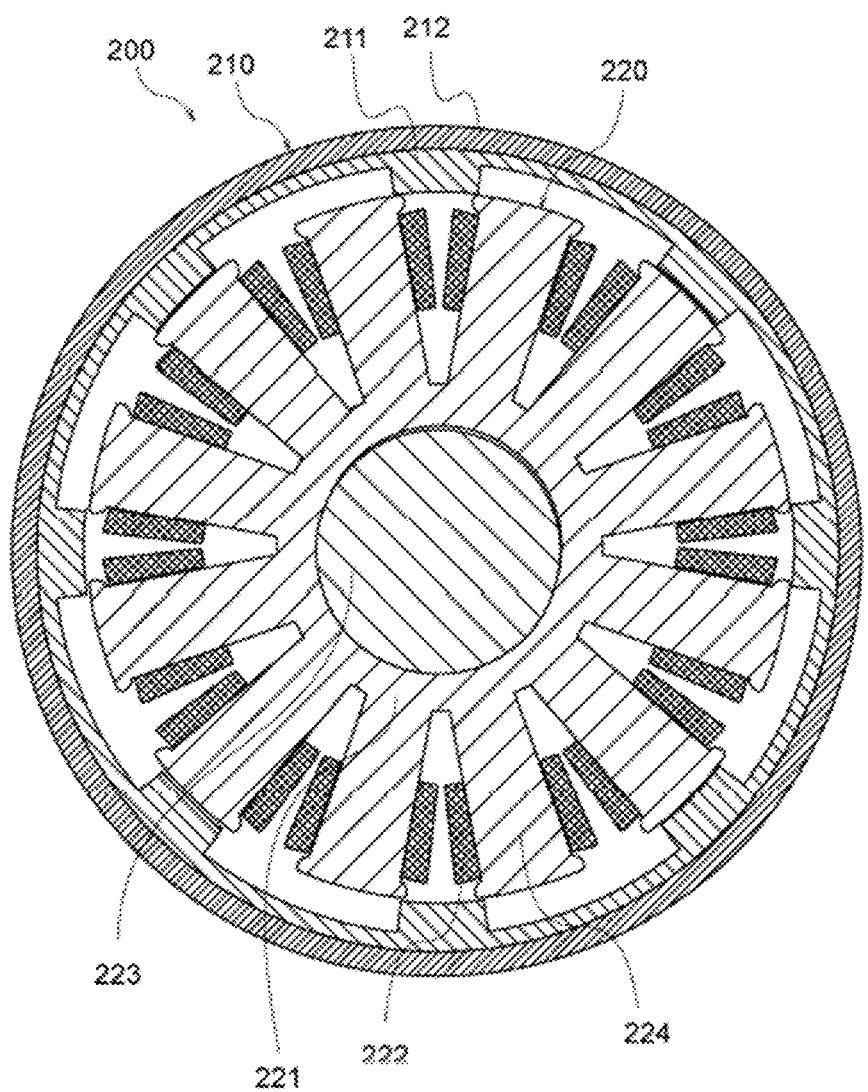
FIG. 19 illustrates a motor with an outer rotor of an example embodiment of the present disclosure.

FIG. 19 illustrates a motor with an outer rotor.

A motor 200 with an outer rotor includes a rotor 210 and a stator 220. The rotor 210 surrounds the stator 220 and rotates around the stator 220. The rotor 210 includes a laminated core 211 and a case 212, and the laminated core 211 is press-fitted into the case 212 to integrate the laminated core 211 and the case 212.

The stator 220 includes a laminated core 221, a coil 222, and a stator holder 223, and the stator holder 223 is press-fitted into the laminated core 221 to be integrated with the laminated core 221. The laminated core 221 includes a plurality of (e.g., here twelve) salient poles 224, and the coil 222 is wound around each of the salient poles 224 by, for example, concentrated winding.

For example, the structure of the second example embodiment illustrated in FIGS. 12 and 13 is applied to the rotor 210 of the motor 200 illustrated in FIG. 19. The structure of the second example embodiment protects the laminated core 211 when the laminated core 211 is press-fitted into the case 212, and positions the laminated core 211 with respect to the case 212 as the laminated core 211 is press-fitted.

For example, the structures of the first example embodiment illustrated in FIGS. 2 to 11 and the modification illustrated in FIGS. 14 to 16 are applied to the stator 220 illustrated in FIG. 19. The structure of the first example embodiment or the modification protects the laminated core 221 when the stator holder 223 is press-fitted into the laminated core 221, and positions the stator holder 223 with respect to the laminated core 221 as the stator holder 223 is press-fitted, or press-fitted and crimped.

Although in the above description, examples of the application target in the motor armature, the motor, and the method for manufacturing a motor armature of the present disclosure include a reluctance motor, the application target of the motor armature, the motor, and the method for manufacturing a motor armature of the present disclosure is not limited to the above, and those of the present disclosure are applicable to various motors using a laminated core, such as a DC motor, an AC motor, and a stepping motor.

Although in the above description, examples of the application target in the motor armature, the motor, and the method for manufacturing a motor armature of the present disclosure include a three-phase motor, the motor armature, the motor, and the method for manufacturing a motor armature of the present disclosure may be applied to a single-phase motor or an n-phase motor other than the three-phase motor.

It is to be considered that the example embodiments described above are illustrative in all aspects, and are not restrictive. The scope of the present disclosure is indicated by the scope of claims rather than the example embodiments described above, and is intended to include all modifications within the meaning and scope equivalent to the scope of claims.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor armature comprising:
a laminated body including a stack of magnetic bodies each having an annular and plate shape;
an extended body that opposes opposing peripheral surfaces of the laminated body and extends along a stacking direction of the magnetic bodies; and
a holder stacked on the laminated body in the stacking direction to hold the laminated body; wherein
the holder includes:
a plate portion that extends along the laminated body and has higher rigidity than the magnetic bodies; and
a sleeve portion that extends in contact with the extended body;
the extended body includes:
a first shoulder surface opposing an extending direction of the extended body and being in contact with the holder to position the extended body in the extending direction; and
a second shoulder surface opposing a circumferential direction around the opposing peripheral surfaces and being in contact with the holder to position the extended body in the circumferential direction;
the opposing peripheral surfaces include a first inner peripheral surface having a first inner diameter and a second inner peripheral surface having a second inner diameter, the first inner diameter being larger than the second inner diameter;
the first inner peripheral surface is directly opposed to the sleeve portion of the holder and the second inner peripheral surface is directly opposed to the extended body; and
the first inner peripheral surface and the second inner peripheral surface both extend in parallel with the extended body along the stacking direction.

2. The motor armature according to claim 1, wherein the holder includes the sleeve portion that extends from the plate portion toward the laminated body.

3. The motor armature according to claim 2, wherein the plate portion includes an adjacent portion that is adjacent to the extended body and is in contact with the first shoulder surface.

4. The motor armature according to claim 3, wherein the adjacent portion is closer to the laminated body than to an outer end surface of the plate portion to define a step between the adjacent portion and the outer end surface of the plate portion.

5. The motor armature according to claim 3, further comprising:
a protrusion that protrudes from the adjacent portion along the extended body and is in contact with the second shoulder surface.

6. The motor armature according to claim 1, wherein the extended body includes the second shoulder surface that is recessed from a surface of the extended body.

7. The motor armature according to claim 1, wherein
the laminated body includes a surface opposing the plate portion and including a recess; and
the plate portion includes a protrusion fitted into the recess.

8. The motor armature according to claim 1, wherein the plate portion includes an edge that is spaced away from the extended body and at least partially includes a fracture surface.

9. The motor armature according to claim 1, wherein the magnetic bodies each have a thickness of about 0.35 mm or less.

10. A motor comprising the motor armature according to claim 1, the motor armature defining at least one of a stator and a rotor.

11. A method for manufacturing a motor armature, the motor armature including a laminated body including a stack of magnetic bodies each having an annular and plate shape, an extended body that opposes opposing peripheral surfaces of the laminated body and extends along a stacking direction of the magnetic bodies, and a holder stacked on the laminated body in the stacking direction to hold the laminated body, the opposing peripheral surfaces include a first inner peripheral surface having a first inner diameter and a second inner peripheral surface having a second inner diameter, the first inner diameter being different from the second inner diameter, the method comprising:

holding the holder including a plate portion that extends along the laminated body and has higher rigidity than the magnetic bodies and a sleeve portion that extends in contact with the extended body, while stacking the holder on the laminated body;

press-fitting the extended body into the laminated body held by the holder, the extended body including a first shoulder surface opposing an extending direction of the extended body and a second shoulder surface opposing a circumferential direction around the opposing peripheral surface, such that an inner peripheral surface of the sleeve portion is in contact with an outer peripheral surface of the extended body, an outer peripheral surface of the sleeve portion is in contact with an inner peripheral surface of the laminated body, and one of the first inner peripheral surface and the second inner peripheral surface is in contact with the outer peripheral surface of the extended body; and positioning the first shoulder surface in the extending direction by bringing the first shoulder surface into contact with the holder, and the second shoulder surface in the circumferential direction by bringing the second shoulder surface into contact with the holder.

12. A method for manufacturing a motor armature, the motor armature including a laminated body including a stack of magnetic bodies each having an annular and plate shape, an extended body that opposes an opposing peripheral surface that is at least one of an inner peripheral surface and an outer peripheral surface of the laminated body and extends along a stacking direction of the magnetic bodies, and a holder stacked on the laminated body in the stacking direction to hold the laminated body, the method comprising:

holding the holder including a plate portion that extends along the laminated body and has higher rigidity than the magnetic bodies and a sleeve portion that extends in contact with the extended body, while stacking the holder on the laminated body;

press-fitting th extended body into the laminated body held by the holder, the extended body including a first shoulder surface opposing an extending direction of the extended body and a second shoulder surface opposing a circumferential direction around the opposing peripheral surface; and positioning the first shoulder surface in the extending direction by bringing the first shoulder surface into contact with the holder, and the second shoulder surface in the circumferential direction by bringing the second shoulder surface into contact with the holder; wherein the motor armature includes the holder with the plate portion including an extended portion extending in a direction away from the extended body; and the method further comprises removing the extended portion after the positioning.

* * * * *